Figures 1, 2:
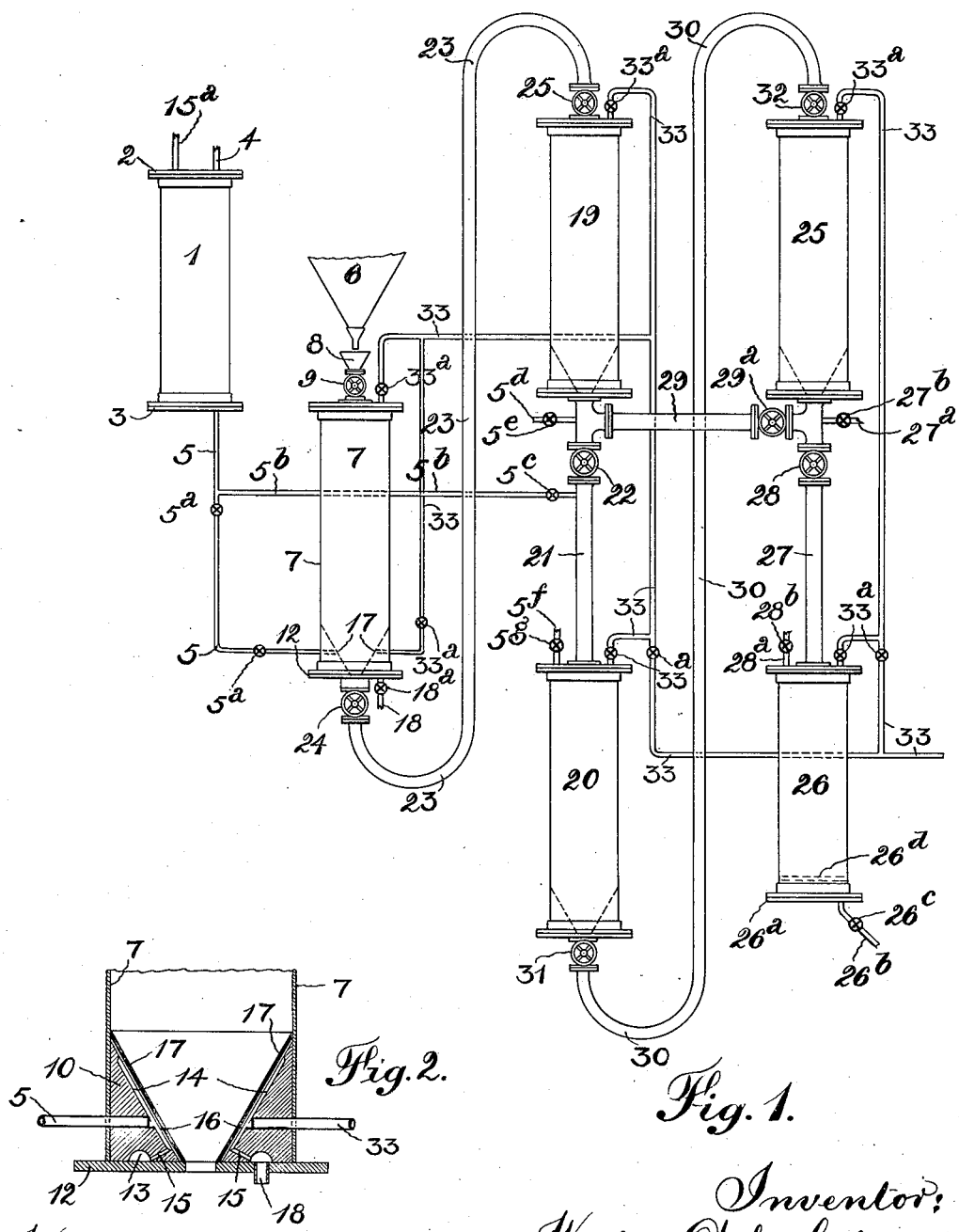

No. 891,459. PATENTED JUNE 23, 1908.
W. A. CALDECOTT.
PROCESS OF TREATING CRUSHED ORE PRODUCTS.
APPLICATION FILED JUNE 18, 1907.

3 SHEETS—SHEET 1.

Witnesses:
F. Ovendale
F. A. Ovendale

Inventor:
William Arthur Caldecott
by Chas. Ovendale
Attorney.

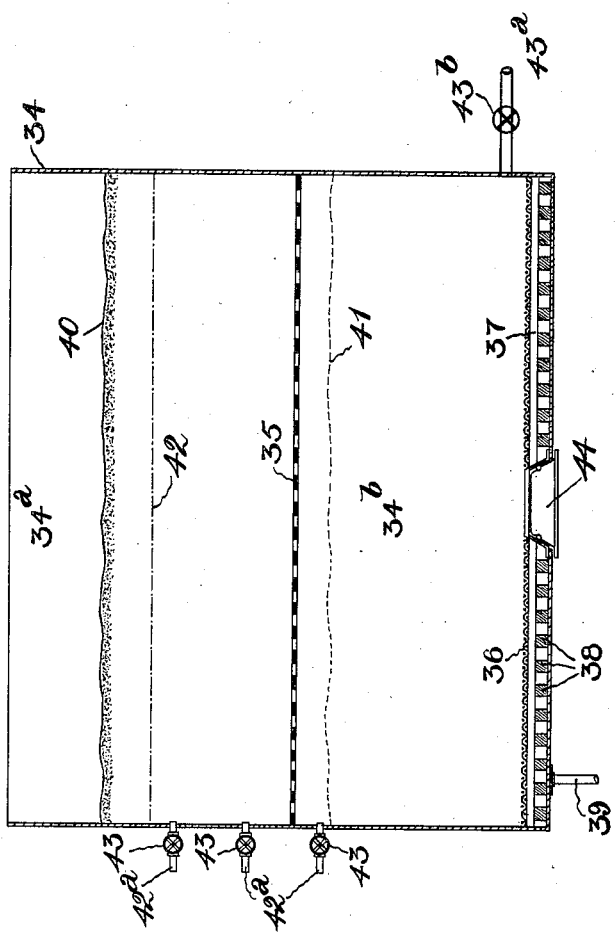

No. 891,459. PATENTED JUNE 23, 1908.
W. A. CALDECOTT.
PROCESS OF TREATING CRUSHED ORE PRODUCTS.
APPLICATION FILED JUNE 18, 1907.

3 SHEETS—SHEET 3.

Inventor:
William Arthur Caldecott
by Chas. Ovendale
Attorney.

Witnesses:
F. Ovendale
F. A. Ovendale

UNITED STATES PATENT OFFICE.

WILLIAM ARTHUR CALDECOTT, OF JOHANNESBURG, TRANSVAAL.

PROCESS OF TREATING CRUSHED ORE PRODUCTS.

No. 891,459.   Specification of Letters Patent.   Patented June 23, 1908.

Application filed June 18, 1907. Serial No. 379,645.

*To all whom it may concern:*

Be it known that I, WILLIAM ARTHUR CALDECOTT, a subject of the King of Great Britain, and resident of Johannesburg, Transvaal, have invented certain new and useful Improvements in the Process of Treating Crushed Ore Products, of which the following is a specification.

This invention consists of improvements in the processes for treating crushed auriferous or argentiferous ore products by cyanid or other solvent solution, for the recovery of the precious metal contents.

One object of the present invention is to reduce the time required under existing processes or modes of treatment to recover the precious metals, and a further object is to reduce both the initial and working costs of the plant or apparatus required, as compared with existing processes.

For the carrying out of my invention I preferably employ cyanid solution containing more dissolved oxygen than is usually found in working cyanid solutions. The increase of dissolved oxygen may be obtained by bringing the solution for a sufficient length of time to allow the oxygen to dissolve, into contact with air or oxygen at such a pressure that the oxygen pressure is above that due to ordinary atmospheric pressure.

In carrying out the invention the cyanid solution, aerated under air or oxygen pressure greater than that of the atmosphere, as described, (hereinafter referred to as the super-aerated solution) is brought into contact with the sand and slime or sand or slime, or any crushed auriferous or argentiferous ore product. The air pressure is preferably maintained after the super-aerated solution is in contact with the material, to prevent the escape of the dissolved oxygen in the solution, to counteract the effect of leakages or absorption of oxygen by the pulp or crushed ore products, and also to be utilized as a means for transferring the pulp from one vessel to another on the montejus or air lift system. It will be apparent that in place of atmospheric air, (which, however, will ordinarily be found the most convenient) gaseous oxygen may be used, as the object is to obtain more oxygen dissolved in the solution than would be possible under ordinary air pressures, and thus accelerate the dissolving of the gold. The super-aerated solution may be allowed to dissolve the gold by contact merely with the solid matter, or the mixture of solution and solid matter may be agitated. The solution having dissolved the precious metal contents of the solid matter, the separation of the now gold-bearing solution for subsequent precipitation of the metal, may be effected by means of a vacuum filter, filter press, or other suitable device; or by allowing the solids in the mixture to fall by gravity through one or more pipes or orifices into a lower closed vessel filled with water or precipitated cyanid solution. If the separation of the gold-bearing solution be effected in the manner last described, then the excess of liquid remaining in the washed solids can be drawn off through a filter in the lower vessel, the removal of the liquid being hastened, if desired, either by positive air pressure in the vessel or by creating a vacuum below the filtering medium.

In the accompanying drawings I represent, more or less diagrammatically, apparatus designed for carrying out the improved process.

Figure 4:
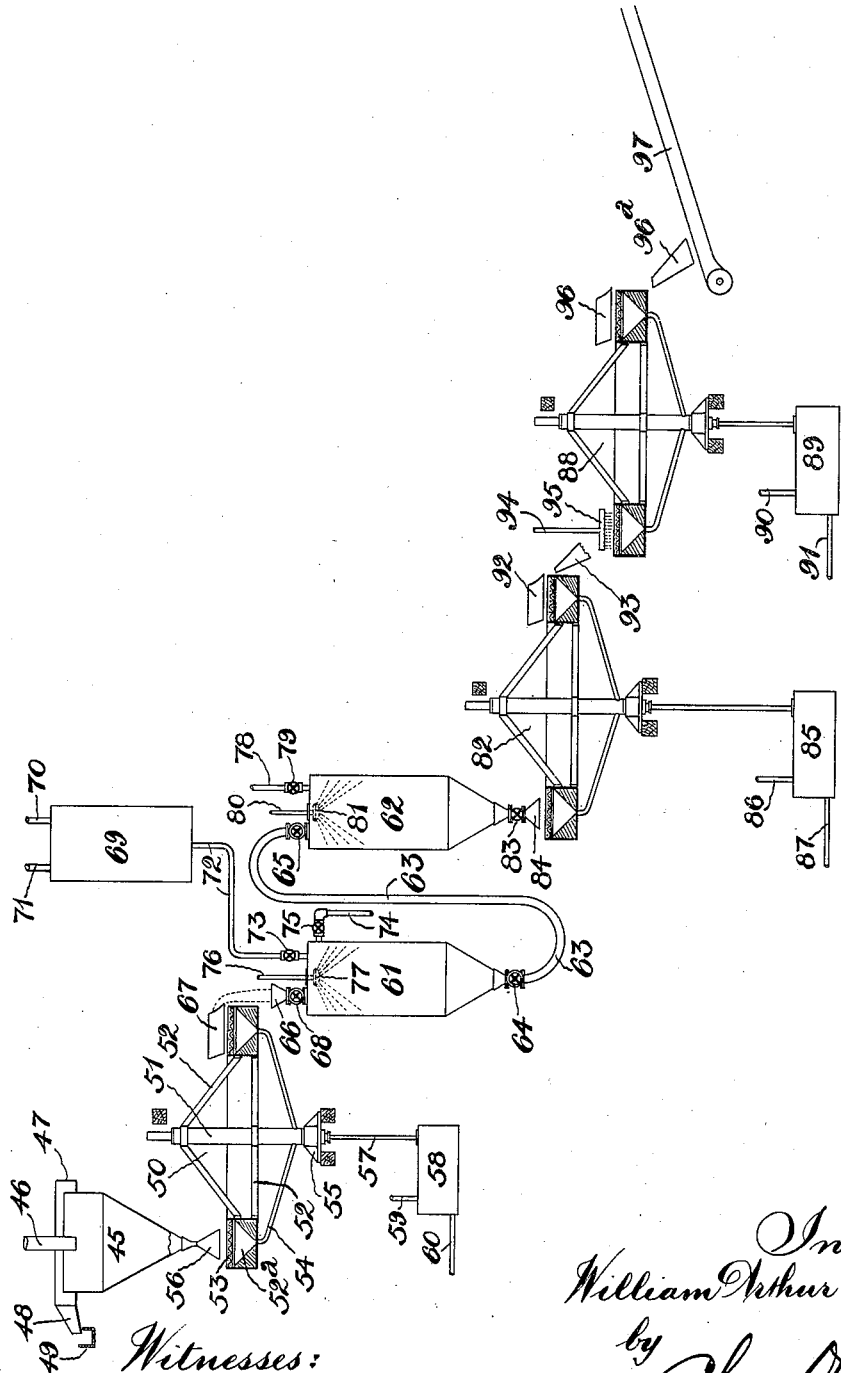

In the drawings: Figure 1 represents one form of the apparatus in elevation. Fig. 2 is a detail of the filter provided in the bottom of the vessel 7. Fig. 3 is a sectional elevation illustrating a modified form of the treatment vessel, and Fig. 4 is a sectional elevation of an alternative form of the apparatus.

Referring to the arrangement of the apparatus illustrated in connection with Figs. 1 and 2, 1 represents a vessel provided with tight fitting covers 2, 3, at both ends. This vessel serves as a receiver for the solution.

4 is a pipe for introducing the solution into the top of the vessel 1, and 5 a pipe communicating with the bottom of the vessel for conveying the super-aerated solution to the treatment vessel. The solution may be conveniently aerated in the vessel 1. The solution having been introduced into the vessel a compressed air or oxygen supply may be conducted into the vessel 1 through the pipe 15$^a$ communicating with the top of the vessel and the air or oxygen pressure be maintained so that the solution becomes super-aerated by absorption of the gas. It will be evident that the super-aeration of the solution may be effected before it is introduced into the vessel 1 and the latter serve merely as a container for said super-aerated solution.

6 is a conical classifier of the spitzkasten or other suitable type into which the battery pulp or other mixture of solids and liquids is introduced. This classifier serves in the usual manner for separating from the solids, the bulk of the water or other liquid. Arranged beneath the classifier 6, is a closed vessel 7.

8 is a hopper located beneath the classifier for receiving the concentrated under-flow therefrom and for conducting it into the vessel 7.

9 is a valve provided between the hopper 8 and vessel 7 for closing the hopper to the vessel when necessary in the operation of the apparatus.

In the bottom of vessel 7 is provided a filter, shown in detail in Fig. 2, comprising a block 10 of wood or other suitable material, located inside the vessel above the bottom cover 12. 13 is an annular groove formed between the block 10 and cover 12. In the inclined internal walls of the block are formed grooves 14 which constitute drainage channels for the filtered liquid. These grooves 14 are placed in communication with the groove 13 by means of holes or passages 15 formed in the block. Over the grooves 14 is placed a suitable filtering medium such as wire netting 16 covered by filter cloth or other suitable material 17.

18 is a pipe fixed to the cover 12 and in communication with the annular groove 13, which pipe serves for conveying the liquid, separated by the filter, from the annular groove 13. The pipe 18 is fitted with a cock $18^a$. If desired this pipe 18 may be placed in communication with a vacuum chamber connected with water and air pumps for drawing the liquid the more rapidly and completely from the vessel 7 to obtain the solids in a suitable condition for treatment with the super-aerated solution.

19, 20, are two other closed vessels, the one arranged above the other and both arranged in a suitable position in relation to the vessel 7. These vessels 19, 20, are connected by means of the pipe 21, which is fitted with the valve 22. The vessel 7 is connected at the bottom with the top of the vessel 19, by means of a pipe 23, which serves for conducting the material from vessel 7 to vessel 19. The pipe 23 is provided with valves 24, 25, immediately beneath the vessel 7 and immediately above the vessel 19 respectively.

The solution supply pipe 5 from the vessel 1 communicates with vessel 7 beneath the filter cloth 17. The pipe 5 is fitted with two cocks $5^a$. A branch pipe $5^b$ from the pipe 5 connects with the pipe 21 between the valve 22 and the bottom vessel 20. The pipe $5^b$ is fitted with the cock $5^c$.

The vessels 19, 20 are preferably made conical at the bottom as indicated by the dotted lines.

$5^d$ is a pipe fitted with cock $5^e$, communicating with the pipe 21 between the bottom of the vessel 19 and the valve 22 for drawing off the solution from the vessel 19.

$5^f$ is a pipe fitted with cock $5^g$ communicating with the top of the vessel 20 for introducing thereinto the precipitated solution or water.

25, 26 are two closed vessels, the one arranged above the other similar to the vessels 19, 20. These vessels 25, 26, like vessels 19, 20, are connected by means of the pipe 27 fitted with the valve 28. The pipe 27 between the bottom of the vessel 25 and valve 28 is fitted with a pipe $27^a$ provided with a cock $27^b$, for drawing off gold bearing solution from vessel 25. The vessel 26 is fitted at the top with a pipe $28^a$ provided with a cock $28^b$ for introducing the precipitated solution or water into vessel 26. The pipe 21 is shown connected above the valve 22 by branch pipe 29 with the pipe 27 above the valve 28; pipe 29 is fitted with valve $29^a$. The lower vessel 20 is connected by means of pipe 30, with the top vessel 25 in like manner to the vessels 7 and 19. The pipe 30 is provided with valves 31, 32, below the vessel 20 and above the vessel 25.

The vessel 26 is provided with a removable cover $26^a$ fitted with a drain pipe $26^b$, the latter provided with a cock $26^c$. The pipe $26^b$ may be coupled up with a vacuum chamber for drawing off the surplus liquid from the solids preparatory to the discharging of the latter. Vessel 26 is provided in proximity to the bottom with a flat filter $26^d$.

33 represents pipes which serve for conducting the compressed air or oxygen supply to the vessels 7, 19, 20, 25 and 26.

$33^a$ are cocks provided on the pipes 33 in suitable positions for controlling the compressed air or oxygen supply to any of the aforementioned vessels.

In the operation of this apparatus the concentrated under-flow from the classifier 6 in delivered by hopper 8 through valve 9 into the vessel 7, until the vessel is full or approximately full. Valve 9 is then closed. The excess of liquid is drained or drawn off through the pipe 18 and the cock $18^a$. This may be effected or accelerated through the medium of the connections of the pipe 18 with the vacuum chamber, or by admitting air or oxygen under pressure into the top of the vessel 7 above the surface of the charge, by means of compressed air or oxygen supply pipe 33 and cock $33^a$. The solution having been admitted to vessel 1 through pipe 4, the compressed air or oxygen supply is admitted to vessels 1 through pipe $15^a$ and the pressure maintained. Compressed air or oxygen may be now admitted to the vessel 7 below the filter-cloth 17 by opening cock $33^a$ on the pipe 33. Subsequently the super-aerated solution is admitted to the bottom of the vessel 7 below the filter-cloth 17 by opening the cocks 5ª on the pipe 5, and by reducing the air pressure in the vessel 7 slightly below that in vessel 1, as for example by opening valve 9. Sufficient of the solution to cover the charge having been admitted to the vessel 7 the supply is shut off by closing the cocks 5ª.

It is desirable, in order to insure a thorough permeation of the mass or charge by the super-aerated solution or compressed air or oxygen, that said solution, air or oxygen be allowed to come into contact with the gold bearing material in vessel 7 slowly or gradually from below. This prevents the solution, air or oxygen suddenly exerting its maximum pressure on the surface of the mass which would reduce the volume of the interstices and prevent the thorough permeation of the mass by said solution, air or oxygen.

After the lapse of a sufficient length of time for the solution to dissolve the gold, the compressed air or oxygen supply is admitted to vessel 7 by opening cock 33ª on pipe 33. The valves 24, 25 on the pipe 23 are now opened and the compressed air or oxygen acting on the surface of the charge effects its transfer from vessel 7 to vessel 19. The valves 24, 25 are then closed. The vessel 20 is filled with precipitated solution or water through pipe 5$^f$ and cock 5$^g$ or with the super-aerated solution by opening the cock 5$^v$ on the branch pipe 5$^b$. The valve 22 in the pipe 21 is then opened. The solids from the upper vessel 19, then fall by gravity down pipe 21 into the lower vessel 20, and gradually displace the solution, which rises up the pipe 21 into the top vessel 19. The particles of the solids are washed by the uprising current which carries the gold bearing solution washed off the particles into the upper vessel 19. Ultimately the whole of the solids are contained in the lower vessel 20 and the bulk of the gold in solution in the upper vessel 19. The valve 22 on the pipe 21 is then closed and the gold bearing solution removed from the vessel 19, through the pipe 5$^d$ and cock 5$^e$, if necessary filtered, and then passed on to the precipitation boxes to recover the metal contents. If desired vessel 20 might be provided at the bottom with a filter and drain pipe similar to vessel 7 so that if necessary the bulk of the solution could be removed from the solids for precipitation, and the precipitated solution subsequently admitted through pipe 5$^f$, so as to render the charge sufficient fluid to admit of its transfer under air pressure to vessel 25. The compressed air or oxygen supply is now admitted through pipe 33 and cock 33ª to the lower vessel 20, and transfers the charge from vessel 20 to vessel 25, the valves 31, 32 on pipe 30 having previously been opened.

The vessel 26 having been filled with water or precipitated solution through pipe 28ª and cock 28$^b$, and the valves 31, 32 on the pipe 30 closed, the valve 28 on the pipe 27 is opened. The solids then fall by gravity from the upper vessel 25 down the pipe 27 into the lower vessel 26 gradually displacing the water or precipitated solution which forms an uprising current washing the particles of solids as they fall from the upper to the lower vessel. Ultimately the solids are all received in the lower vessel 26 and the bulk of the solution, transferred with the charge from vessel 20 to vessel 25, remains in the latter. The valve 28 is then closed, the solution withdrawn through pipe 27ª and cock 27$^b$ from the vessel 25 for precipitation, if necessary. The surplus liquid is now drained from the solids in the vessel 26 through the filter 26$^d$ by means of pipe 26$^b$ and cock 26$^c$, and the residues ultimately discharged from the said lower vessel 26 for conveyance to the dump. The withdrawal of the surplus liquid may be accelerated by the admission to the vessel 26 of the compressed air or oxygen supply through pipe 33 and cock 33ª. The compressed air supply may be admitted to the vessel 25 after the charge has been transferred to it from vessel 20.

It will be obvious that the super-aerated solution may, if preferred, be withdrawn from the vessel 7 through pipe 18 and cock 18ª, and a quantity of precipitated solution or water be subsequently introduced into the vessel 7 to be transferred with the solids from the vessel 7 to the vessel 19.

If found desirable to still further agitate the mixture it may be transferred for one or more times from vessel 19 to vessel 25 by opening valve 29ª on pipe 29 and closing valves 22, 25, 28 and 32 and admitting the compressed air or oxygen supply to vessel 19 or vessel 25 to transfer the charge to the other of them.

In Fig. 3 I illustrate a modified form of the washing vessels. In place of the two pairs of super-positioned vessels 19, 20 and 25, 26, connected by the pipes 21, 27, respectively, shown in Fig. 1, I provide one or more single vessels 34 which may be of cylindrical or other suitable configuration. The vessel 34 is divided into two intercommunicating compartments or chambers by means of a horizontally disposed perforated diaphragm or division plate 35. The capacity of the upper compartment 34ª is somewhat larger than that of the lower compartment 34$^b$. In the bottom of the vessel is arranged a filter comprising the filter cloth 36 or other suitable material placed above the parallel bars or laths 37 which latter rest upon another series of parallel bars or laths 38 arranged at right angles thereto. The passages formed between the laths provide the channels through which the liquid may be drained or drawn off, (after passing through the filter cloth 36) from the solids after they have been deposited in the lower chamber 34$^b$. 40 represents the level of the solids (after they have been treated to dissolve the gold) introduced into the upper compartment 34$^a$, and 41 the level of the solids in the lower compartment 34$^b$, after passing through the perforations in the diaphragm 35. 42 is the final level of the solution in the vessel 34. In the side or sides of the vessel 34 I preferably provide a number of pipes 42$^a$ fitted with cocks 43 to allow the super-natant solution to be drawn off at different levels. 43$^a$ is the pipe, fitted with cock 43$^b$ for introducing the solution into the compartment 34$^b$. 39 is the drain pipe which may be connected with a vacuum chamber as previously described and serves for removing the excess of liquid from the solids after they are deposited in the lower compartment 34$^b$. 44 is a discharge door provided in the bottom of the vessel 34 through which the residues may be discharged from compartment 34$^b$. If the vessel 34 were closed after introduction of the moist solids into the upper compartment 34$^a$, and super-aerated solution introduced into the lower compartment 34$^b$ until its level were slightly above that of the diaphragm, the solids would then fall gradually through the perforations in the diaphragm into the aerated solution so that efficient contact would be secured of the solution with each particle, and the dissolving of the gold effected.

In Fig. 4, I illustrate an alternative arrangement of the apparatus for carrying out the process. In this arrangement the spitzkasten or conical classifier is represented at 45$^a$. 46 is a pipe for conveying the pulp to the classifier, 47 an annular launder surrounding the upper edge of the classifier and serving to receive the overflow therefrom, and 48 a discharge spout delivering said overflow into a launder 49 along which it may be conducted to any desired point. For the purpose of removing the excess of liquid from the concentrated underflow before treating it with the superaerated solution, I employ a rotary vacuum filter 50. The construction and mode of operating this filtering device is fully described in a prior application for patent filed by me on the 18th day of March 1907, under Serial No. 363,072. It consists of a rotatable hollow shaft 51, carrying through the medium of arms 52, a structure providing a horizontally disposed annular vacuum chamber 52$^a$. The chamber 52$^a$ which is covered by the filtering medium 53 is placed in communication with the interior of the hollow shaft 51 by a suitable number of pipes 54. 55 is any suitable support for shaft 51. The underflow from the classifier 47 is distributed over the width of the filtering medium 53 by a conical spreader or inclined tray 56. A pipe 57 places the interior of the shaft 51 in communication with a vacuum chamber 58, connected through pipe 59 with an air pump (not shown) and through pipe 60 with a water pump—also not shown. 61 and 62 are two cylindrical or other suitably shaped vessels located in juxtaposition to each other and to the rotary vacuum filter 50. These vessels 61, 62 are, like the vessels 7, 19 and 20, 25, connected by means of pipe 63, fitted with valves 64, 65. On the top of the vessel 61 is provided a hopper 66 which receives the moist solid matter removed from the surface of the filtering medium 53 by means of a scraper or plow 67. Between the hopper 66 and interior of the vessel 61 is interposed a valve 68. In a convenient position in relation to the vessel 61 is arranged the vessel 69 which is utilized as the container for the super-aerated solution. 70 is the pipe for introducing the solution into the vessel 69, and 71 the pipe for introducing the air or oxygen under pressure. 72 is the pipe, fitted with cock 73, for conveying the super-aerated solution from vessel 69 to vessel 61. 74 is the pipe, fitted with cock 75, for leading into the top of vessel 61, the compressed air or oxygen supply. 76 is another pipe entering the top of vessel 61, and fitted with a rose 77 inside the vessel, for introducing into the vessel precipitated solution or water to flush out the vessel or for any other purpose. The other vessel 62 is also equipped with pipe 78 and cock 79 for the compressed air, or oxygen supply, and pipe 80 and rose 81 for the precipitated solution or water supply. Another rotary vacuum filter 82, which, as shown, may be of the same construction as the filter 50, is arranged contiguous to the discharge outlet in the bottom of the vessel 62. The outlet of the vessel is shown fitted with a valve 83, and spreader 84 for distributing the mixture nearly the full width of the filtering medium of the filter 82. This filter, like filter 50, works conjunctively with a vacuum chamber 85, connected with air and water pumps, by pipes 86, 87 respectively. A further rotary vacuum filter 88, which may also be of the same construction as filter 50, is located adjacent to the filter 82. This filter 88 is also operatively connected with a vacuum chamber 89, in communication through the medium of pipes 90, 91 with air and water pumps respectively. A scraper or plow 92 operates to remove from the surface of the filtering medium of filter 82, the solid matter and deliver it into a chute 93 which conducts it onto the filtering medium of the filter 88. 94 is a pipe terminating in a perforated horizontal tubular member 95, which delivers a quantity of precipitated solution or water over the solid matter deposited onto the surface of the filtering medium of the filter 88, to serve as a final wash therefor. 96 is another scraper or plow for removing the residual washed solid matter from the surface of the filtering material of filter 88, and conducting it to a chute 96ª which delivers it into a belt conveyer 97 or other suitable means for conveying it to the dump.

In the operation of this apparatus the bulk of the water is first separated from the pulp in the classifier 45, and the excess of water remaining in the underflow is subsequently separated by the rotary vacuum filter 50. The matter is thereafter received in the treatment vessel 61, and after a full charge has entered it the valve 68 is then closed. Compressed air is now slowly admitted through pipe 74 and cock 75, and cock 75 then closed. The super-aerated solution is now slowly admitted to vessel 61 through cock 73, in sufficient quantity to cover the charge, and the cock 73 then closed. After the lapse of sufficient time for the solution to have dissolved a portion of the gold, the valves 64, 65 on the pipe 63 are opened, and further compressed air or oxygen admitted to the vessel 61, by opening cock 75 on pipe 74. The charge is thereupon transferred from vessel 61 through pipe 63 to vessel 62. The valves 64, 65 are now closed, and after the lapse of sufficient time for the solution to have dissolved the remainder of the gold the valve 83, in the outlet of vessel 62 is opened, which allows the charge to flow from vessel 62 on to the surface of the filtering medium of filter 82. The discharging of the charge from vessel 62 may be accelerated by admitting the compressed air or oxygen to the vessel above the charge through pipe 78 and cock 79. If desired the precipitated solution or water may be subsequently admitted to vessels 61, 62, through pipes 76, 80 and roses 77, 81, to flush the vessels before admitting a fresh charge. The now gold bearing solution is separated from the solids by the vacuum filter 82 and its connections, and conveyed to the precipitation boxes to recover the metal contents. The solids are now received on the filtering medium of the filter 88 and the wash of precipitated solution or water delivered as a spray through pipe 94 and drawn through the layer of solids by the action of said vacuum filter 88. The solution washed out of the solids by the spray and separated by the filter 88 may be conveyed to the precipitation boxes to extract the metal contents, or be reused in the process. Finally the residue is removed by scraper 96 from the surface of the filtering medium and delivered onto the belt conveyer 97 for transference to the residue dump.

It will be apparent that the vessels 61, 62 might be fitted with filters and drain pipes 18 and the super-aerated solution and compressed air or oxygen be admitted beneath the filtering medium, as has been previously described in connection with vessel 7 in Figs. 1 and 2.

What I claim as my invention and desire to protect by Letters Patent is:

1. The process of treating crushed auriferous ore products which consists in treating said products with a super-aerated solvent solution under a maintained pressure greater than atmospheric pressure, and then agitating the mixture of ore products and solution by and under such pressure, as set forth.

2. The process of treating crushed auriferous ore products which consists in treating said products with a super-aerated solvent solution under a maintained pressure greater than atmospheric pressure, and then agitating the mixture of ore products and solution by transferring it under pressure from vessel to vessel, as set forth.

3. The process of treating crushed auriferous ore products consisting in separating the excess of liquid from the pulp, then treating the separated solids with a super-aerated solvent solution under a maintained pressure greater than that of the atmosphere, then agitating the mixture by transferring it under pressure from one vessel to another, and then separating the gold bearing solution from the mixture, as set forth.

4. The process of treating crushed auriferous ore products which consists in separating the excess of liquid from the pulp, treating the separated solids with a super-aerated solvent solution under a maintained pressure greater than that of the atmosphere, agitating the mixture by admitting further compressed air or oxygen to the container so as to transfer the contents to another vessel, then separating the gold bearing solution, then treating the separated solids, with precipitated solution or water in a closed vessel, then transferring the mixture from the closed vessel to a further vessel and then separating the gold bearing solution from the solids, as set forth.

5. The process of treating crushed auriferous ore products which consists in separating the bulk of liquid from the pulp then separating the remaining excess of liquid, then treating the separated solids in a closed vessel with a super-aerated solvent solution under a maintained pressure, then separating the solution from the solids, then filtering the solids to remove the remaining solution then treating the solids with precipitated solution or water and finally separating the solution or water from the solids, as set forth.

6. The process of treating crushed auriferous ore products consisting in separating the liquid from the pulp then treating the solids in a closed vessel with super-aerated solvent solution under a maintained pressure then agitating the charge by admitting air or oxygen under pressure so as to transfer the charge to another vessel, then separating the gold bearing solution then washing the solids with precipitated solution or water and then removing said solution or water from the solids, as set forth.

In witness whereof I have hereunto set my hand in the presence of two subscribing witnesses.

WILLIAM ARTHUR CALDECOTT.

Witnesses:
   CHAS. OVENDALE,
   FRED. OVENDALE.